(No Model.)
C. GARNETT.
BOLT FASTENING.
No. 604,896. Patented May 31, 1898.
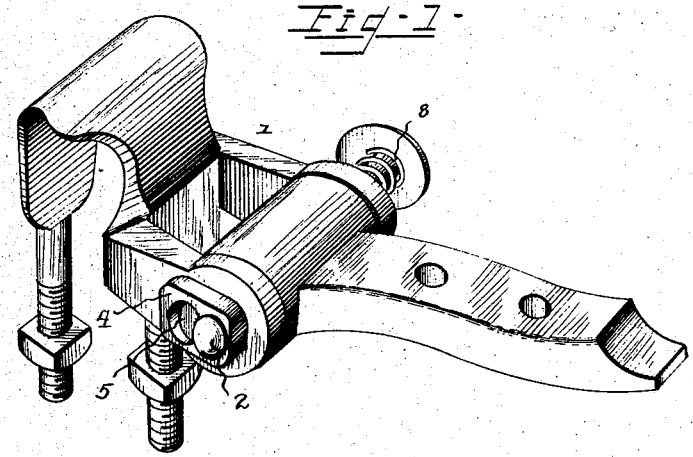
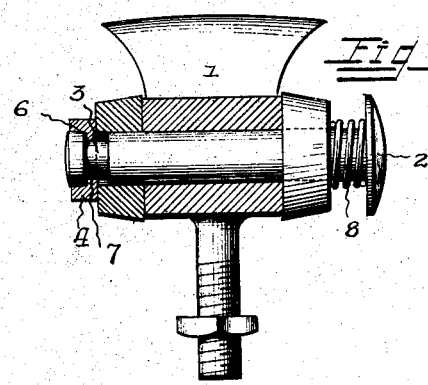
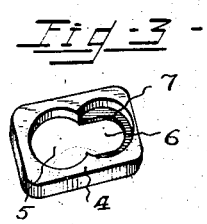
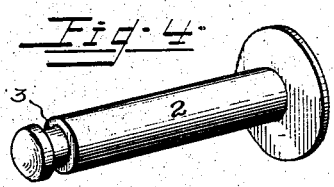
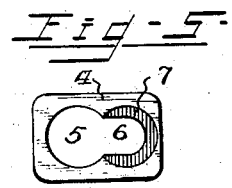
Witnesses
C. J. Young.
V. B. Hillyard.
Carroll Garnett, Inventor:-
By his Attorneys,
C. A. Snow & Co.

United States Patent Office.

CARROLL GARNETT, OF FRONT ROYAL, VIRGINIA.

BOLT-FASTENING.

SPECIFICATION forming part of Letters Patent No. 604,896, dated May 31, 1898.

Application filed January 10, 1898. Serial No. 666,241. (No model.)

*To all whom it may concern:*

Be it known that I, CARROLL GARNETT, a citizen of the United States, residing at Front Royal, in the county of Warren and State of Virginia, have invented a new and useful Bolt, of which the following is a specification.

This invention has relation to bolts, and more especially to the means for securing the same in a locked position.

An essential feature of the invention is the combination, with a bolt having an annular groove at the end remote from its head, of a locking-plate having companion openings intercommunicating, one of the said openings having an inner ledge or shoulder at one end to engage with the outer wall of the annular groove of the bolt and limit the movement of the latter, the portion of the bolt exterior to the annular groove entering the enlarged end of the opening in the locking-plate, so as to prevent longitudinal movement and displacement thereof after the parts have been properly positioned.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a thill-coupling, showing an application of the invention. Fig. 2 is an elevation thereof, partly in section. Fig. 3 is a detail perspective view of the locking-plate. Fig. 4 is a detail view of the bolt. Fig. 5 is a plan view of the locking-plate.

Corresponding and like parts are referred to in the following description and indicated in all the views of the drawings by the same reference characters.

In the drawings the thill-coupling 1 is shown as a matter of convenient illustration for demonstrating the application of the invention. The bolt 2 is mounted in openings formed in the ears or cheek-pieces of the clip and is provided at the end remote from the head with an annular groove 3, which is intended to receive the contracted end of the opening in the locking-plate, by means of which the bolt is secured.

The locking-plate 4 is of oblong form and provided with intercommunicating openings 5 and 6 of like size and corresponding to the diameter of the engaging end of the bolt 2. The space between the opposing walls of the openings at their point of juncture is less than the diameters of the said openings and corresponds to the diameter of the reduced portion of the bolt formed by the annular groove 3. One of the openings, as 6, has an inner flange or shoulder 7 at one end, and the space formed between the opposing sides of the flange or shoulder 7 corresponds to the diameter of the reduced portion of the bolt and to the space formed at the juncture of the openings 5 and 6. As a result of this construction the opening 6 is contracted at one end, which in practice is the inner end, the outer end of the said opening being of a size to receive the end portion of the bolt exterior to the groove 3 and which fits snugly therein.

After the bolt has been inserted in an opening formed in the part to which it is to be applied the locking-plate is passed over the projecting end which enters the opening 5. The locking-plate is now moved longitudinally, so as to bring the end of the bolt in the opening 6, the reduced or grooved portion 3 entering the space formed at the inner or contracted end of the opening, whereby outward displacement of the locking plate or bolt is prevented by the flange or shoulder 7 engaging with the outer wall of the groove 3. The bolt is moved in the opening 5 to bring the end portions exterior to the groove 3 into the enlarged end of the opening 5, when the locking-plate is in turn secured against longitudinal movement because of the reduced space at the juncture of the intercommunicating openings, and which space or passage is of less diameter than the end portion of the bolt seated in the enlarged end of the opening 6. A spring 8 is mounted upon the headed end of the bolt 2 and bears against the opposite side of the part to which the bolt is applied and normally exerts an outward pressure against the head of the bolt, thereby serving at all times to hold the engaging end of the bolt seated within the enlarged end of the opening 6. When applying or releasing the bolt, it is necessary to apply pressure to the head, so as to cause the engaging end of the bolt to leave the opening 6 and bring the groove 3 in register with and in the plane of the locking-plate, after which the latter is moved longitudinally to bring the opening 5 in coincident relation with the bolt, when the locking-plate and the bolt can be separated.

Having thus described the invention, what is claimed, and desired to be secured by Letters Patent, is—

1. In combination, a bolt or pin having an annular groove forming a reduced portion, and a locking-plate provided with a pair of intercommunicating openings, the passage at the juncture of the openings being less than the diameter of the engaging end of the bolt, and one of the openings having its inner end contracted forming a flange or shoulder to engage with the outer wall of the said annular groove of the bolt, the end portion of the bolt exterior to the groove obtaining a seat in the enlarged end of the opening having its inner end contracted, substantially as set forth.

2. In combination, a bolt or pin having an annular groove forming a reduced portion, a locking-plate having a pair of intercommunicating openings, the space at the juncture of the openings being less than the diameter of the openings, and one of the openings having its inner end contracted forming an inner flange or shoulder to receive the reduced portion of the bolt and engage with the outer wall of the annular groove, and a spring arranged to normally move the locking-plate and bolt apart, whereby the engaging end of the bolt is held seated in the enlarged end of the opening having its inner end contracted, substantially as set forth.

3. In combination, a bolt having an annular groove near its outer end, a spring mounted upon the inner end of the bolt and adapted to exert an outward pressure against the head thereof when the bolt is in position, and a locking-plate having intercommunicating openings through one of which the engaging end of the bolt is adapted to be thrust, and the other opening having its inner end contracted forming an inner flange or shoulder to receive the reduced portion of the bolt and engage with the outer wall of the annular groove, the end of the bolt exterior to its reduced portion obtaining a seat in the enlarged end of the opening having its inner end contracted and held in said seat by the aforedescribed spring, substantially as and for the purpose set forth.

4. In combination, a bolt or pin having a shouldered or projecting portion, a locking-plate having intercommunicating openings, one of the openings adapted to have the shouldered end of the bolt or pin thrust therein, and the other opening receiving the said shouldered end by a sliding movement of the locking-plate, and a spring for moving the bolt and locking-plate apart to cause the latter to engage with the shouldered or projecting portion of the said bolt or pin and secure the latter, substantially as set forth.

In testimony that I claim the foregoing as my own I have hereto affixed my signature in the presence of two witnesses.

CARROLL GARNETT.

Witnesses:
JOHN H. SIGGERS,
HAROLD H. SIMMS.